(12) United States Patent
Vermeer et al.

(10) Patent No.: US 7,959,113 B2
(45) Date of Patent: *Jun. 14, 2011

(54) NETWORK CABLE BUNDLING TOOL

(75) Inventors: Michael J. Vermeer, Lansing, IL (US); Richard A. Marcus, Manteno, IL (US); Robert J. Krisel, Manhattan, IL (US); David W. West, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/551,032

(22) Filed: Aug. 31, 2009

(65) Prior Publication Data

US 2009/0314902 A1  Dec. 24, 2009

Related U.S. Application Data

(63) Continuation of application No. 11/972,863, filed on Jan. 11, 2008, now Pat. No. 7,600,721.

(60) Provisional application No. 60/951,317, filed on Jul. 23, 2007.

(51) Int. Cl.
*F16L 3/00* (2006.01)

(52) U.S. Cl. ........... 248/49; 248/56; 248/68.1; 248/74.2

(58) Field of Classification Search ............ 248/49, 248/56, 68.1, 55, 74.1, 74.2, 74.3; 140/123, 140/147, 93.2; 439/369, 779, 449

See application file for complete search history.

(56) References Cited

U.S. PATENT DOCUMENTS

| 2,209,063 | A | 7/1940 | Merrick |
| 3,092,360 | A | 6/1963 | Cook et al. |
| 3,651,544 | A | 3/1972 | Soma |
| 3,667,101 | A | 6/1972 | Kloth |
| 4,086,427 | A | 4/1978 | Nasuta, Jr. et al. |
| 4,174,882 | A | 11/1979 | McCartney |
| 4,366,939 | A | 1/1983 | McMillan |
| 4,494,520 | A | 1/1985 | Hurwitz |
| D278,793 | S | 5/1985 | Smith et al. |
| 4,558,918 | A | 12/1985 | Shores |
| D284,262 | S | 6/1986 | Finley |
| 4,673,309 | A | 6/1987 | Schlaich et al. |
| 4,769,876 | A | 9/1988 | Platt |

(Continued)

FOREIGN PATENT DOCUMENTS

GB 768339 2/1957

*Primary Examiner* — Ramon O Ramirez

(74) *Attorney, Agent, or Firm* — Robert A. McCann; Christopher S. Clancy; James H. Williams

(57) ABSTRACT

A network cable bundling tool is disclosed, comprising an inner fitting retained within an outer jacket assembly. The outer jacket assembly comprises a first outer jacket half coupled to a substantially identical second outer jacket half, securing the inner fitting therein. The outer jacket assembly comprises a cylindrical housing, an intake orifice defined within the intake housing, and a plurality of funneling projections coupled to the cylindrical housing wherein the plurality of funneling projections form an array assuming the general shape of a truncated faceted cone. In operation, network cable wires are inserted into the inner fitting, and the inner fitting is then secured within the outer jacket assembly. The network cable bundling tool is then displaced in the desired direction of combing, arranging the network cables into an organized and space-efficient shape.

14 Claims, 9 Drawing Sheets

U.S. PATENT DOCUMENTS

| | | |
|---|---|---|
| 4,771,743 A | 9/1988 | McDowell |
| D298,798 S | 12/1988 | Finley |
| D311,487 S | 10/1990 | Platt |
| D314,324 S | 2/1991 | Allison |
| 4,998,343 A | 3/1991 | Costello |
| 5,027,478 A | 7/1991 | Suhr |
| 5,168,842 A | 12/1992 | Brooks |
| 5,179,919 A | 1/1993 | Foltz, Jr. et al. |
| 5,207,857 A | 5/1993 | Tanabe et al. |
| 5,236,227 A | 8/1993 | Adams et al. |
| 5,360,188 A * | 11/1994 | Condon .......................... 248/56 |
| 5,526,619 A | 6/1996 | Vagedes |
| 5,669,572 A | 9/1997 | Crook |
| 5,703,330 A | 12/1997 | Kujawski |
| D390,447 S | 2/1998 | Colen, Jr. |
| 5,742,982 A | 4/1998 | Dodd et al. |
| 6,012,940 A | 1/2000 | Wheeler |
| 6,119,668 A | 9/2000 | Richards et al. |
| 6,328,010 B1 | 12/2001 | Thurman |
| 6,375,017 B1 * | 4/2002 | Schattner et al. .......... 211/85.13 |
| 6,426,462 B1 | 7/2002 | Mignon et al. |
| D462,604 S | 9/2002 | Denton |
| 6,528,728 B1 | 3/2003 | Shima |
| 6,710,249 B1 | 3/2004 | Denton |
| 6,976,512 B2 | 12/2005 | Loeffler et al. |
| 7,073,541 B2 | 7/2006 | Pappas |
| 7,089,971 B2 | 8/2006 | Spain |
| 7,343,940 B2 | 3/2008 | Loeffler et al. |
| 7,500,644 B2 * | 3/2009 | Naudet et al. ................ 248/68.1 |
| 2002/0104577 A1 | 8/2002 | McGroarty |
| 2003/0222185 A1 * | 12/2003 | Rubenstein et al. ......... 248/68.1 |
| 2004/0217236 A1 | 11/2004 | Shibuya |
| 2006/0091266 A1 | 5/2006 | Leiser et al. |
| 2006/0096654 A1 | 5/2006 | Loeffler et al. |
| 2006/0201565 A1 | 9/2006 | Coupe |
| 2007/0187555 A1 * | 8/2007 | Rabanin ......................... 248/49 |
| 2008/0173773 A1 | 7/2008 | Opperthauser |
| 2009/0026323 A1 | 1/2009 | Vermeer et al. |

* cited by examiner

NETWORK CABLE BUNDLING TOOL

CROSS REFERENCE TO RELATED APPLICATION

This application is a continuation of U.S. patent application Ser. No. 11/972,863, filed Jan. 11, 2008 now U.S. Pat. No. 7,600,721, which claims priority to U.S. Provisional Patent Application No. 60/951,317, filed Jul. 23, 2007, the subject matter of which is hereby incorporated by reference in its entirety.

FIELD OF THE PRESENT INVENTION

The present invention is directed to a device used to organize network cables and, more particularly, to a network cable bundling tool assembly comprising an inner fitting, to accept and organize individual cable strands into a cable bundle, and an outer jacket assembly, to secure the inner fitting and funnel the cable bundle down to a minimum bundle diameter.

BACKGROUND OF THE PRESENT INVENTION

Data center and network installations involve routing thousands of heavy data transfer cables, such as CAT 5 cable, to various locations within and outside of the data center. Since the wiring diagrams of a data center are very complex, the cable installation must be done in an extremely organized way. In most cases, these cables are organized in bundles of, typically, either twelve or twenty-four cables. Further, these cable bundles are secured with hook and loop cable ties, secured around the outer perimeter of the bundles at approximately six-inch intervals. Due to space constraints, organizational requirements and aesthetic reasons, the installers are extremely careful not to allow any of the cables to cross each other when creating these bundles. This cable organization process is difficult and time-consuming, especially when done by hand, since each cable needs to be manipulated so that it remains in its position for the length of the bundle.

Various means have since been introduced to simplify the cable bundling process. One example is illustrated in U.S. patent application Ser. No. 09/776,591 (Publication No. 2002/0104577), entitled "Wire Comb," filed 2 Feb. 2001 and published 8 Aug. 2002 ("the '591 application"). The contents of the '591 application is hereby incorporated by reference in its entirety. Generally, the '591 application discloses a one-piece device for combing and straightening cables, ultimately forming them into a bundle. The one-piece device includes a plurality of round passages extending through the device, each passage sized to receive an individual cable strand. The loose end of each individual cable strand is threaded into one of the passages, and the device is pulled the entire length of the cables, resulting in a relatively ordered cable bundle.

However, this one-piece wire comb is not without its drawbacks. Specifically, the one-piece wire comb requires that the loose end of the cable is to be fed through each individual passage. Thus, if the technician bundling the cable is required to terminate this task at any time prior to completion, the bundling process must be painstakingly reversed to free the one-piece wire comb from the individual cable strands. The comb must then be reloaded with cable strands and advanced to the desired location when the technician resumes the bundling process. This laborious process makes mid-bundling adjustments impractical and expensive.

U.S. Pat. No. 6,976,512, entitled "Wire Comb," filed 8 Jan. 2004 and issued 20 Sep. 2005 ("the '512 patent"), illustrates one attempt to overcome the foregoing problems associated with end-loading cable bundling devices of the '591 application. An identical comb device is also disclosed in U.S. patent application Ser. No. 11/294,434 ("the '434 application"), filed 6 Dec. 2005 and published 11 May 2006 as Publication No. 2006/0096654. The contents of both the '512 patent and '434 application are hereby incorporated by reference in their entireties. Both references disclose a two-piece assembly, an inner hub component and an outer collar component. The hub includes slots configured to accept a plurality of to-be-bundled individual cable strands. The cable strands are then individually inserted longitudinally into the slots and the hub is placed into the outer collar.

Similarly, U.S. Pat. No. 7,073,541, entitled "Cable/Wire Dressing Tool," filed 4 Mar. 2004 and issued 11 Jul. 2006 ("the '541 patent"), discloses a cable/wire dressing tool that may be used to somewhat organize bundles of cable without end loading. The contents of the '541 patent is hereby incorporated by reference in its entirety. The '541 patent includes a center hole sized to accept a plurality of wires or cables, along with a plurality of individual slots about the outer perimeter to accept a limited number of individual wires or cables.

Although the devices disclosed in the '512 patent, '434 application and '541 patent overcome the disadvantage inherent in the '591 application—that being, end-loading cable combs—shortcomings nevertheless remain. One such problem is the relatively large overall volume of the resulting cable bundles. The devices disclosed in the '512 patent, '434 application and '541 patent produce a cable bundle that is somewhat organized, but, however, not oriented in an optimized and efficient manner.

In the '512 patent and '434 application, this is partially due to the radial organizational scheme of the cables. Additionally, the radial orientation of the cable guides in the '512 patent and '434 application limits the ability to utilize the comb in the middle of a length of a bundle of cable strands. With radially-oriented wings, the user cannot merely insert the comb into the middle of a bundle and rotate the comb to a perpendicular orientation without laborious strand threading. Also, the orientation of cables in the star-shaped pattern of the '512 patent and '434 application is not the most compact and, therefore, organized configuration of strands may not result. Furthermore, the '512 patent and '434 application require additional projections on the hub portion to interface with recesses on the collar portion to effectively connect and operate to comb wires. This necessarily increases complexity of operation.

The '541 patent lacks any organizational means for the wires in its interior orifice, which comprise the majority of the to-be combed cables. Since thousands of data cables are routed to a typical data center, and since the allowable storage space for the routed cables is limited, a compact bundle is necessary to conserve storage space and allow for the maximum number of cables to be routed through existing storage spaces to avoid a costly and time-consuming expansion of storage infrastructure.

Thus, it would be desirable to provide an inexpensive and convenient means to quickly organize groups of cables resulting in a compact and space-efficient cable bundle that overcomes the disadvantages in the previously-disclosed devices.

SUMMARY OF THE PRESENT INVENTION

A network cable bundling tool is disclosed, comprising an inner fitting retained within an outer jacket assembly. The outer jacket assembly comprises a first outer jacket half coupled to a substantially identical second outer jacket half, securing the inner fitting therein. The outer jacket assembly comprises a cylindrical housing, an intake orifice defined within an intake housing and a plurality of funneling projections coupled to the cylindrical housing. The plurality of funneling projections form an array assuming the general shape of a truncated faceted cone. In operation, network cable wires are inserted into the inner fitting, and the inner fitting is then secured within the outer jacket assembly. The network cable bundling tool is then displaced in the desired direction of combing, arranging the network cables into an organized and space-efficient shape.

DETAILED DESCRIPTION OF THE PRESENT INVENTION

The illustrated embodiments of the present invention are directed to a cable comb that organizes and bundles individual cable strands.

Figure 1:
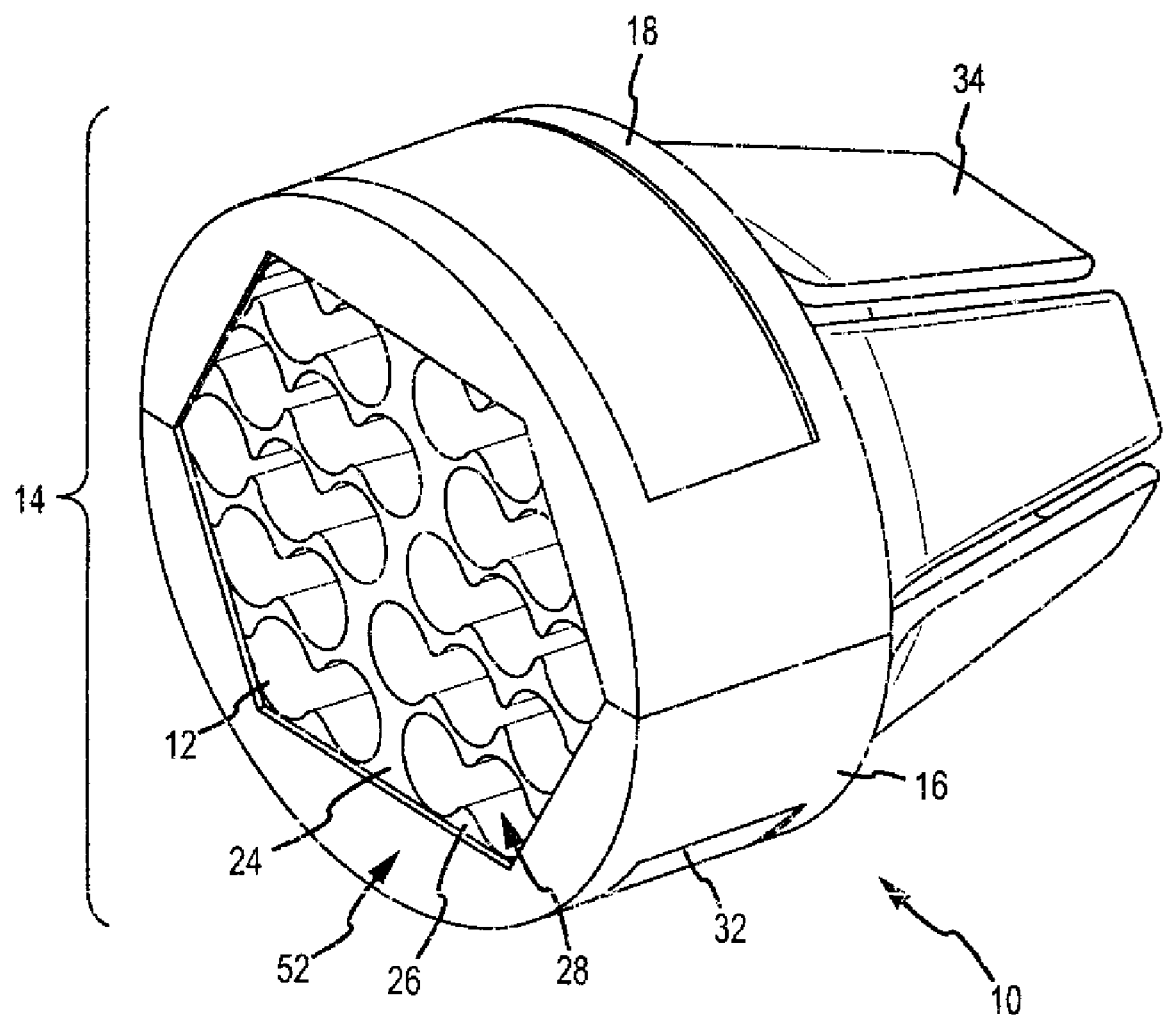
FIG. 1 illustrates a perspective view of the network cable bundling tool, manufactured in accordance with the tenets and teachings of the present invention.

Referring now to the Figures, in which like elements are represented by the same reference numerals, a network cable bundling tool for organizing and bundling a plurality of network cables is generally indicated in FIG. 1 by reference numeral 10. Network cable bundling tool 10 preferably includes inner fitting 12 secured within outer jacket assembly 14. As more clearly illustrated in FIGS. 1 and 3, outer jacket assembly 14 is comprised of first outer jacket half 16 that mates with substantially identical second outer jacket half 18, with mated outer jacket assembly 14 retaining inner fitting 12 therein.

Figure 4:
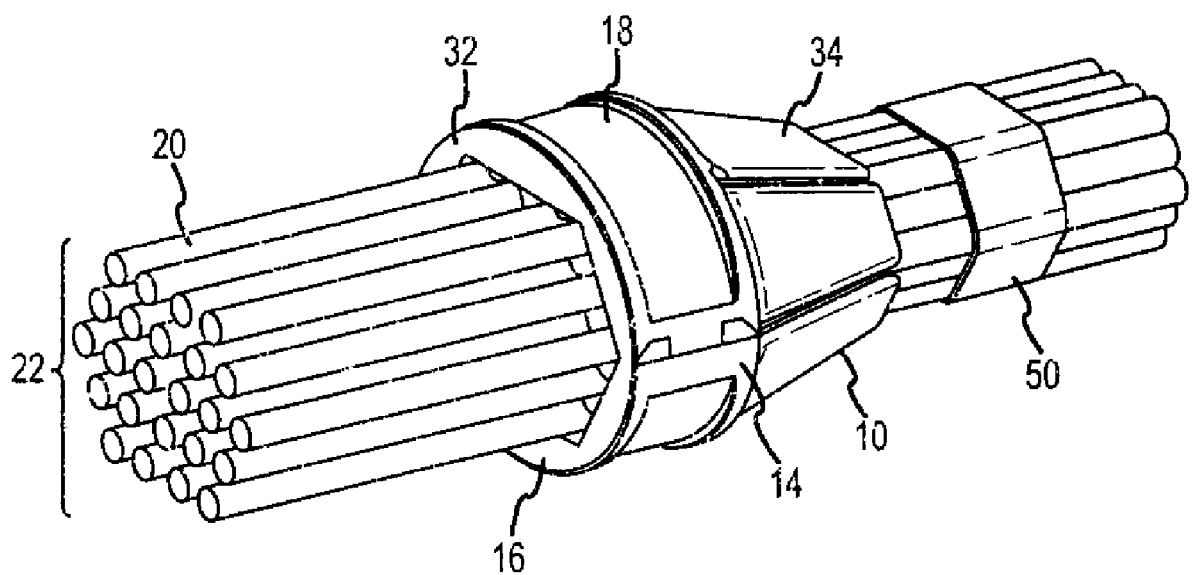
FIG. 4 illustrates a perspective view of one embodiment of the network cable bundling tool of FIG. 1 in the process of organizing and bundling network cables.

For spatial reference, the term "longitudinal direction" is hereby defined as a direction that is substantially parallel with the longitudinal axis of any of individual cable strands 20 comprising cable bundle 22, as illustrated in FIG. 4. Additionally, the term "radial direction" is hereby defined to be a direction that is normal to the longitudinal direction defined herein.

Figure 2:
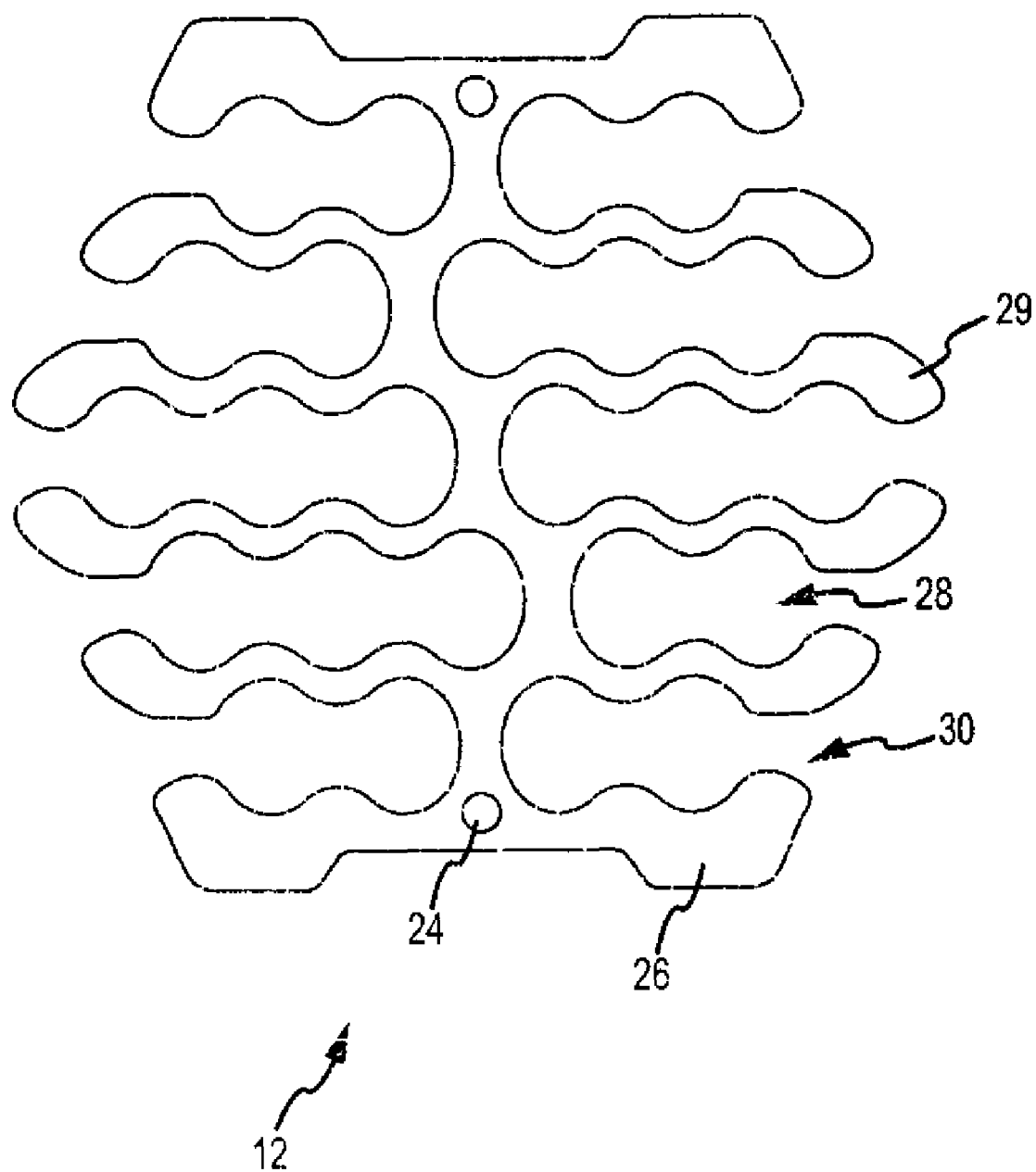
FIG. 2 illustrates a front view of the inner fitting of the network cable bundling tool of FIG. 1.

One embodiment of inner fitting 12 is illustrated in FIGS. 1 and 2. Inner fitting 12 is generally comprised of inner fitting spine 24. A plurality of inner fitting wings 26 extend from inner fitting spine 24 in a direction substantially perpendicular to the orientation of inner fitting spine 24 when viewed from the longitudinal direction. Inner fitting wings 26 include partially-contoured surfaces, wherein the voids created by the partially-contoured surfaces of adjacent inner fitting wings 26 define pockets 28 used to receive individual cable strands 20.

Preferably, the arrangement of pockets 28 is such that they define an optimally close-packed arrangement, representing the highest number of circular cables that can be fit in a given area. Preferably, terminal end 29 of one inner fitting wing 26 does not contact any portion of adjacent inner fitting wing 26, resulting in gap 30, allowing individual cable strands 20 to be received into and retained by a pocket 28. Terminal end 29 may be formed with lead-in angles to facilitate ease of wire entry into pockets 28. The plurality of pockets 28, defined by the contours of inner fitting wings 26, are arranged to minimize the amount of open space between individual cable strands 20 as they are organized into cable bundle 22.

One embodiment of inner fitting 12 is illustrated in FIG. 2. When inner fitting 12 is viewed from the longitudinal direction, inner fitting spine 24 takes on a non-linear, staggered shape that is substantially vertical in orientation. Integrally formed with inner fitting spine 24 are twelve inner fitting wings 26, disposed in a direction that is substantially horizontal when viewed from the longitudinal direction. Each inner fitting wing 26 includes a surface that is substantially contoured wherein the contoured surfaces of adjacent inner fitting wings 26 define twenty-four pockets 28 that are substantially semi-circular when viewed from the longitudinal direction. However, in alternate embodiments of the present invention, the contours of inner fitting wings 26 can define other various numbers of pockets 28.

The contoured surfaces of inner fitting wings 26 also form protrusions that define a plurality of gaps 30 between adjacent inner fitting wings 26, wherein the vertical space between the adjacent protrusions that define each gap 30 may be less than the cross-sectional diameter of individual cable strand 20. However, tool 10 may be used with cables having diameters less than gap 30. Each inner fitting wing 26 also includes a substantially linear surface such that, when viewed from the longitudinal direction, the outer perimeter of inner fitting 12 is substantially polygonal in shape.

In the embodiment illustrated in FIG. 2, the outer perimeter of inner fitting 12 is substantially hexagonal in shape. However, the outer perimeter shape of inner fitting 12 can take the shape of a square, a rectangle, an octagon or any polygon formed by the closest-packed arrangement of a plurality of cable strands. The overall length of inner fitting 12 in the longitudinal direction is smaller than the overall length of cylindrical housing 32 of outer jacket assembly 14 in the longitudinal direction such that inner fitting 12 is capable of being secured within cylindrical housing 32. Inner fitting 12 may be formed to fit in a groove between retaining ridges 48 to inhibit undesired motion in usage.

Figure 3:
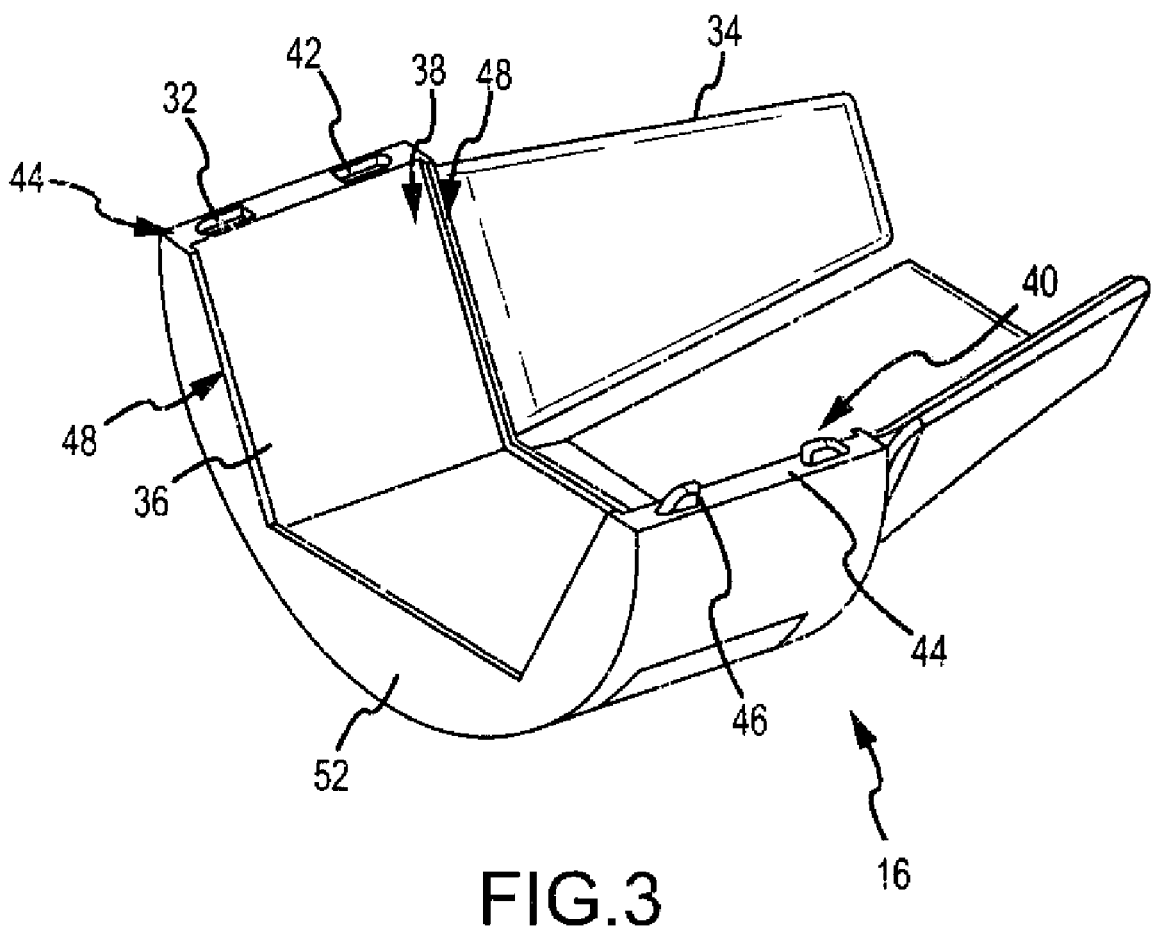
FIG. 3 illustrates a perspective view of the outer jacket half of the network cable bundling tool of FIG. 1.
Figure 5:
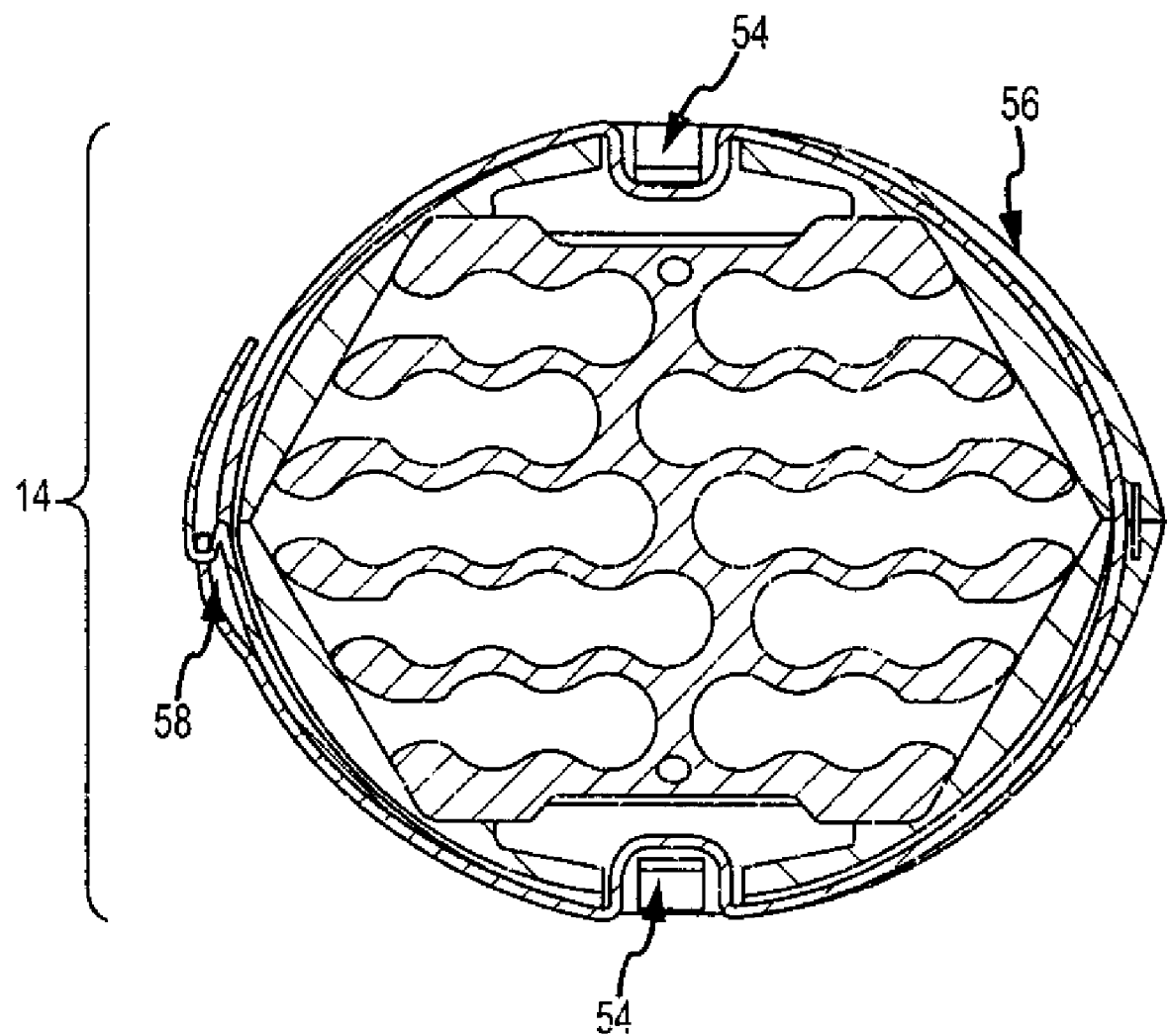
FIG. 5 illustrates a front section view of an alternative embodiment of the network bundling tool.

As stated above, network cable bundling tool 10 also includes outer jacket assembly 14. Outer jacket assembly 14 itself is divided into first and second outer jacket halves 16, 18. An embodiment of first outer jacket half 16 is illustrated in FIG. 3 (it should be understood that second outer jacket half 18 comprises the same elements defined and discussed herein). First outer jacket half 16 is generally comprised of cylindrical housing 32, plurality of funneling projections 34 coupled to cylindrical housing 32 and plurality of interior panels 36 defining intake orifice 38, wherein inner fitting 12 mates with and is secured by plurality of interior panels 36. As illustrated in FIG. 5, first outer jacket half 16 may be provided with tabs 54 to retain strap 56.

An alternative embodiment could be to mold the assembly out of a conductive resin and as well as providing a means for grounding the tool. This would provide a way to eliminate static electricity build-up during the combing process that results from the friction between inner fitting 12 and individual cable strands 20.

Cylindrical housing 32 has a generally arcuate outer perimeter when viewed from the longitudinal direction. The interior of cylindrical housing 32 is comprised of an array of interior panels 36 with the orientation of interior panels 36 defining the general shape of intake orifice 38. Interior panels 36 also include parallel retaining ridges 48 disposed on the perimeter edges of interior panels 36 in a generally radial direction, with one retaining ridge 48 being substantially coplanar with and integral to front surface 52. In one embodiment, each outer jacket half 16, 18 has three interior panels 36 that are designed to mate with hexagonal inner fitting 12 illustrated in FIG. 2. However, the number of interior panels 36 can vary based on the geometry of inner fitting 12. Thus, if the outer perimeter of inner fitting 12 is octagonal in shape, each outer jacket half 16, 18 would include four interior panels 36.

First outer jacket half 16 can also include one or more funneling projections 34 extending from cylindrical housing 32. Each funneling projection 34 is generally planar in shape with a first edge of funneling projection 34 coupled to cylindrical housing 32 by any means known in the art. Each funneling projection 34 can be oriented at an angle such that funneling projection 34 is inclined towards a longitudinal axis, the axis intersecting a point within the interior of first outer jacket half 16.

In the embodiment of the present invention illustrated in FIG. 1, wherein first jacket half 16 is mated to second jacket half 18, funneling projections 34 are integrally formed with cylindrical housing 32 and form an array assuming the general shape of a truncated hexagonal cone. In this embodiment, the base of the truncated hexagonal cone is substantially circumscribed within the circle defined by the outer diameter of cylindrical housing 32 and the terminal end of the hexagonal truncated cone approximates the shape of substantially hexagonal cable bundle 22. In other embodiments, the truncated cone can have any number of faceted sides, or may take the shape of a smooth truncated cone.

One of first or second outer jacket halves 16, 18 can also include one or more latch protrusions 40 formed integrally with cylindrical housing 32, and one or more latch receiving slots 42 formed as recesses in cylindrical housing 32. Latch protrusions 40 and latch receiving slots 42 are disposed in a manner that allows latch protrusions 40 of first outer jacket half 16 to be inserted into latch receiving slots 42 of second outer jacket half 18, while allowing latch receiving slots 42 of the first outer jacket half 16 to receive latch protrusions 40 of second outer jacket half 16 when first and second outer jacket halves 16, 18 are coupled in the manner illustrated in FIG. 1, thereby forming outer jacket assembly 14.

In the embodiment of the present invention illustrated in FIG. 3, first outer jacket half 16 includes two mating surfaces 44, each mating surface 44 being substantially parallel and disposed on a relatively horizontal plane that intersects the outermost edges of cylindrical housing 32. Two latch protrusions 40 are disposed on first mating surface 44, each latch protrusion 40 defining a generally rectangular shape that includes undercut 46 designed to secure latch protrusion 40 within latch receiving slot 42. Second mating surface 44 includes two latch receiver slots 42 oriented to receive a pair of latch protrusions 40 from second outer jacket half 18. In other embodiments of the present invention, the number and shape of the latch protrusions may vary. In further embodiments of the present invention, latch protrusions 40 are not necessary due to an external means to couple first and second outer jacket halves 16, 18 into outer jacket assembly 14.

Figure 6:
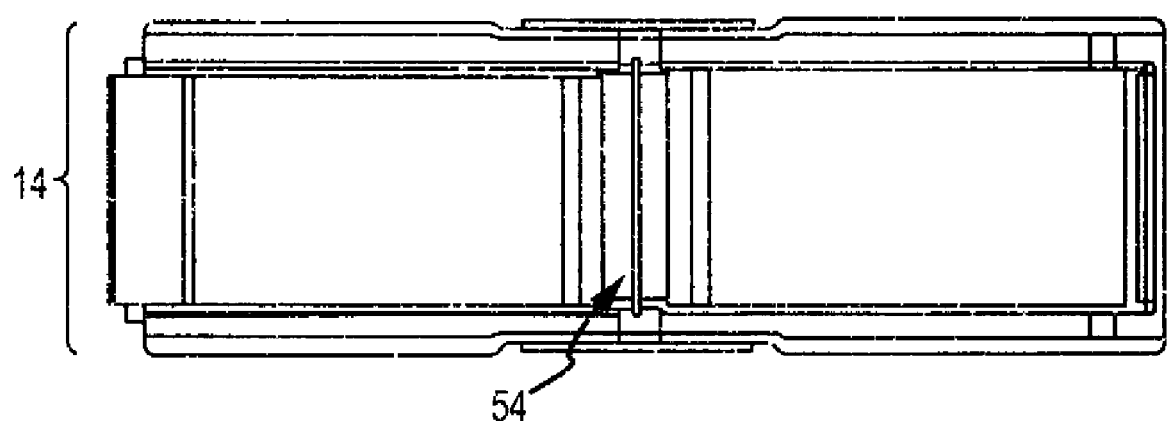
FIG. 6 illustrates a top view of the network bundling tool of FIG. 5.
Figure 7:
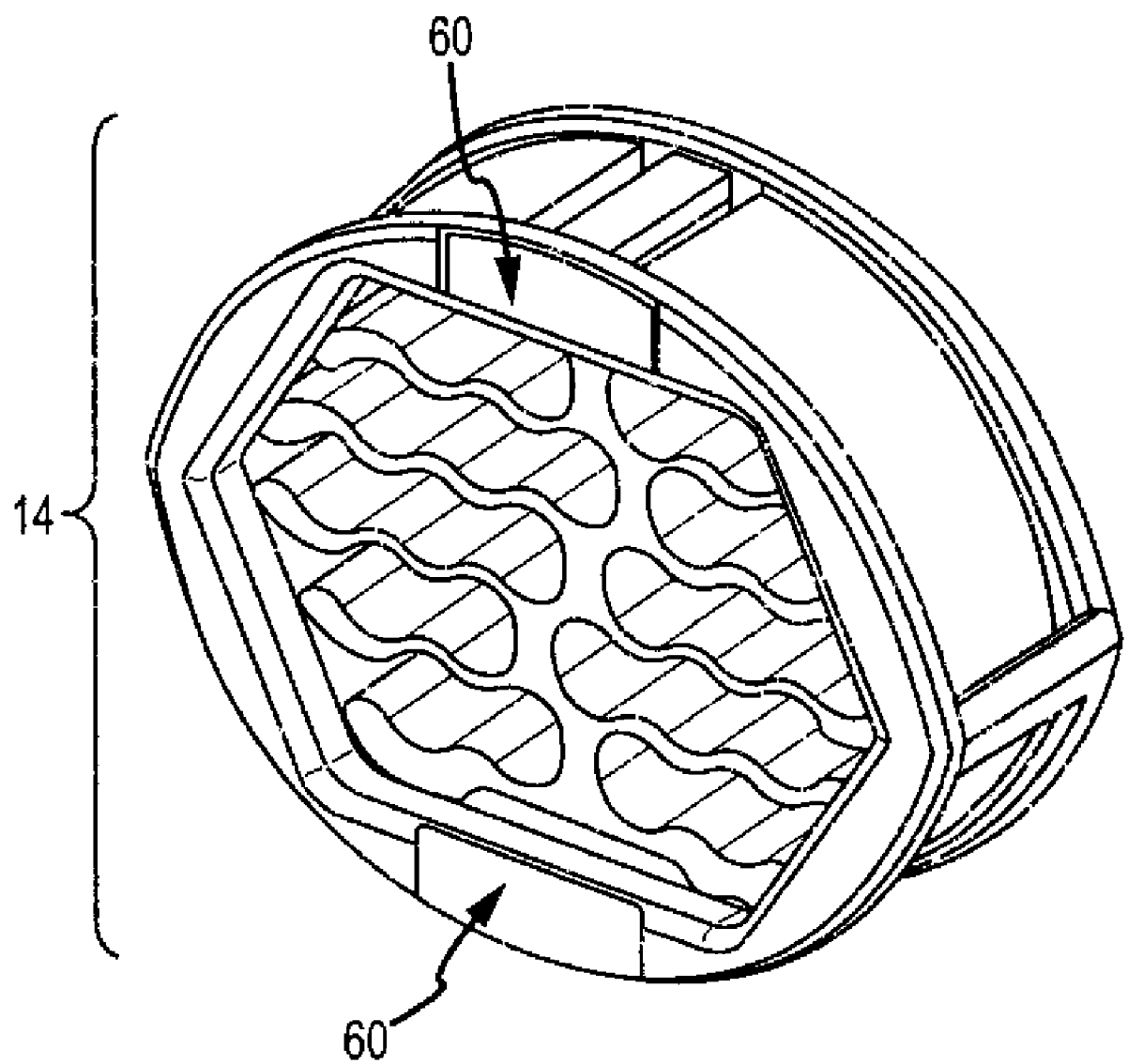
FIG. 7 illustrates a perspective view of the network bundling tool of FIG. 5.

In the embodiment of the present invention illustrated in FIGS. 5 and 6, outer jacket assembly 14 may be provided with tabs 54 to receive buckle 58 and strap 56 which circumferentially engages the outer jacket assembly and maintain engagement between the outer jacket assembly and inner fitting. Strap 56 may maintain such engagement at one of two circumferential contact points of first and second outer jacket halves 16, 18 of outer jacket assembly 14, such that the two outer jacket halves 16, 18 remain connected when not engaged to an insert. As shown in FIG. 7, outer jacket assembly 14 may be provided with arrows 60 to maintain proper tool orientation.

The operation of network cable bundling tool 10 will now be described in detail with reference to FIGS. 1-4.

A user first chooses an appropriate location to begin the combing process and arranges individual cable strands 20 to be bundled in a relatively ordered and parallel orientation. The user feeds individual cable strand 20 into an available pocket in inner fitting 12 by orienting individual cable strand 20 along longitudinally-disposed gap 30 on inner fitting 12 and applying a radial force to individual cable strand 20 in the general direction of inner fitting spine 24. When this force is applied to individual cable strand 20, individual cable strand 20 contacts adjacent inner fitting wings 26, defining gap 30 and displaces inner fitting wings 26, allowing individual cable strand 20 to seat into an appropriate pocket 28. Inward-angled terminal ends 29 of the wings tend to guide individual strands into the desired pocket. This process is repeated for each individual cable strand 20 until each pocket 28 of inner fitting 12 secures one individual cable strand 20. Substantial progress toward fitting each individual cable strand 20 into desired pocket 28 may be achieved by simply inserting the plane of the inner member into a gathering of cables in an orientation where the spine is perpendicular to the longitudinal direction and the wings are parallel to the longitudinal direction, then rotating to an orientation where the wings are perpendicular to the longitudinal. The parallel wings will then tend to comb through the strands and assist in self-alignment.

Inner fitting 12, along with secured individual cable strands 20, is positioned within first outer jacket half 16 such that the surfaces forming the exterior of inner fitting 12 mate with the surfaces forming interior panels 36 of first outer jacket half 16. Inner fitting 12 should seat in a groove formed between the pair of parallel retaining ridges 48.

Figure 8A:
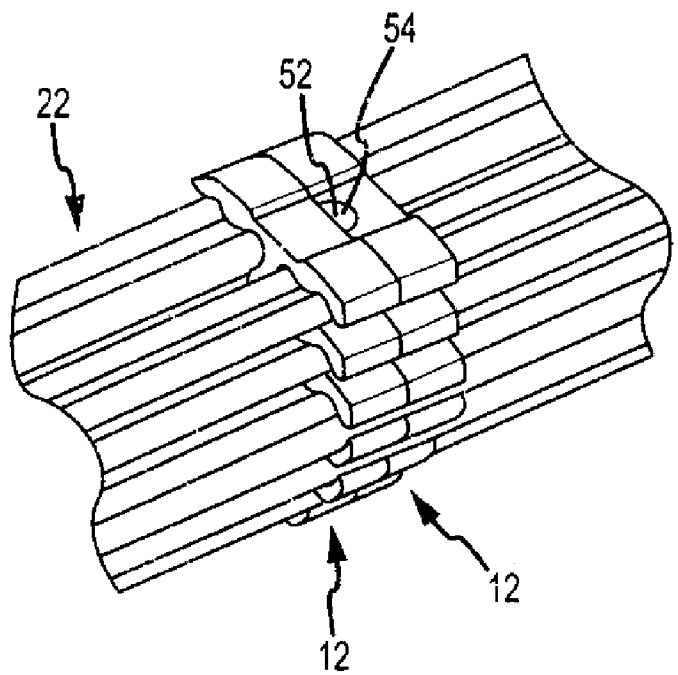
FIGS. 8A-8C illustrate a perspective view of another embodiment of the network cable bundling tool of FIG. 1 in the process of organizing and bundling network cables.
Figure 8B:
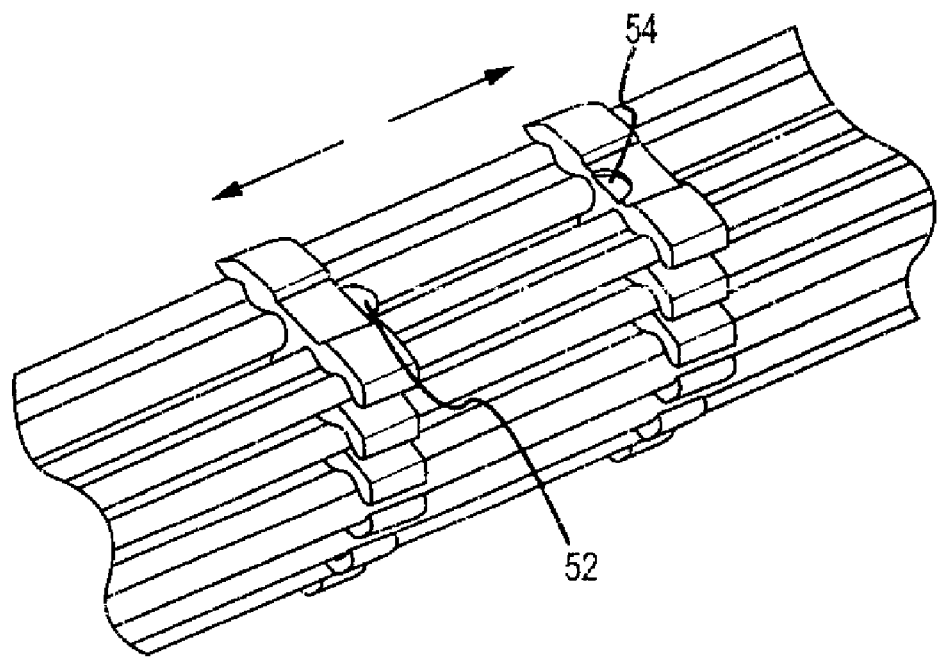
Figure 8C:
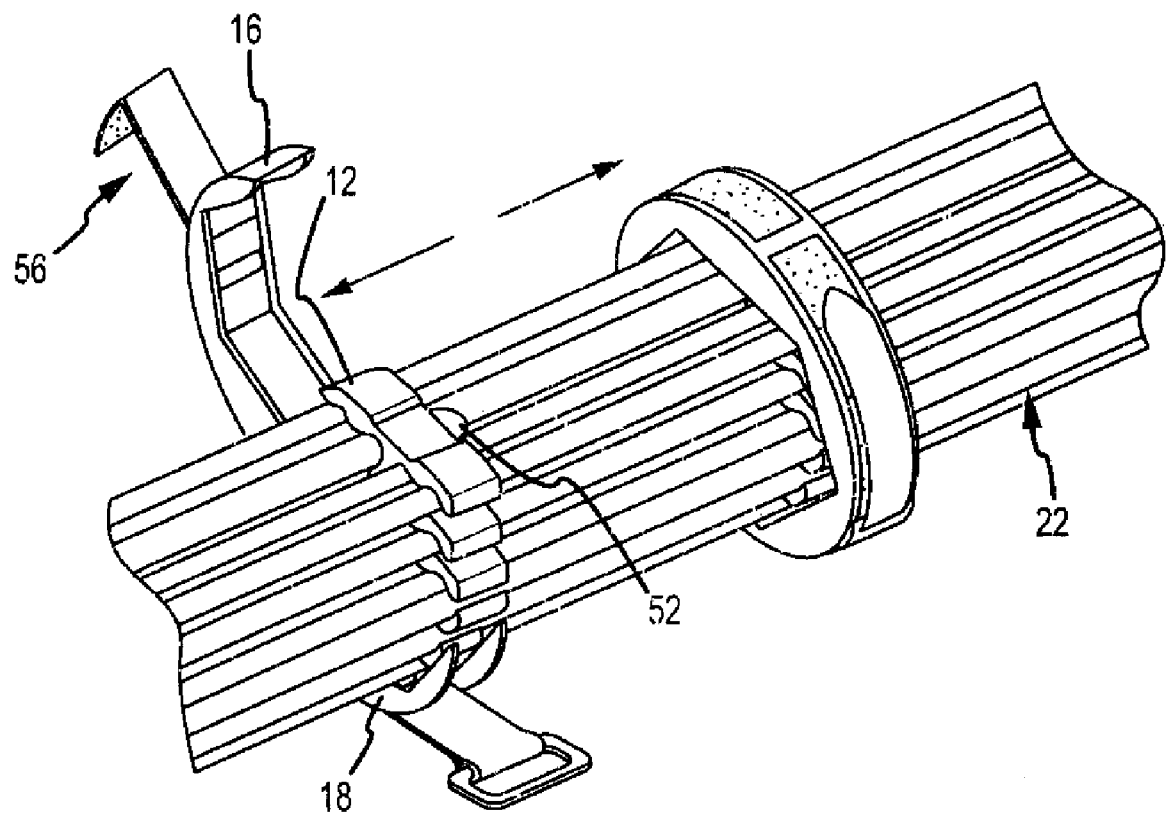

A second outer jacket half 18 is then coupled to the first outer jacket half 16. In the embodiment illustrated in FIG. 3, latch protrusions 40 of first outer jacket half 16 are inserted in latch receiver slots 42 of second outer jacket half 18, such that undercut 46 located on the edge of latch protrusions 40 snaps into a recess in latch receiving slot 42, securing first outer jacket half 16 to second outer jacket half 18. Latch protrusions 40 of second outer jacket half 16 are received into and retained by the latch receiving slots 42 of first outer jacket half 16 in an identical manner. In another embodiment, shown in FIG. 5, buckle 58 may be provided with strap 56 that is insertable though tabs or recesses 54 in the exterior of outer jacket assembly 14. As shown in FIG. 8C, the strap may function as a hinge means when not fastened, thereby retaining the outer jacket halves at only one pivoting contact point. Buckle 58 may serve to tighten strap 56 and retain the inner fitting within the outer jacket assembly. Additionally, the inner surface of the outer jacket assembly may be provided with a recessed circumferential grove between retaining ridges 48 formed to retain the inner fitting. Network cable bundling tool 10 is now assembled and ready for combing.

To comb individual cable strands 20, the user grasps the exterior of cylindrical housing 32 and displaces network cable bundling tool 10 in the direction of combing. As network cable bundling tool 10 is displaced, the plurality of funneling projections 34 apply an inward force in the radial direction, compressing cable bundle 22 into a compact and efficient shape. In the embodiment illustrated in FIG. 4, inner fitting 12 and funneling projections 34 are generally hexagonal in shape, but other shapes can be used. As network cable bundling tool 10 continues to be displaced, cable bundle 22 may be secured with hook and loop cable tie 50 or any other cable tie known in the art. Optimally, the cable tie is applied at six inch intervals to maintain the compact orientation of individual cable strands 20 in cable bundle 22. The resulting cable bundle 22 is compact and organized, allowing a technician to trace a specific cable's termination point by noting the cable's position in cable bundle 22. Bundle size is also optimized by orienting cables in the most efficient manner, giving the smallest diameter bundle for any given cable size.

Additionally, the present invention provides a means to facilitate two bundling tools working in concert. Referring to FIG. 8A, two inner fittings 12 are inserted into cable bundle 22 at a point along its length. Because the inserts are in direct contact with one another, the cables of the bundle may be placed in identical configurations in each insert. Referring to FIGS. 8B-8C, the inserts may be separated and engaged with outer jacket halves 16, 18. The inner fittings may be provided with corresponding tabs 52 and recesses 54 to facilitate such alignment. The cable bundle 22 may then be combed in the above-disclosed manner by two operators working in concert, thus creating an optimally bundled cable in half the time.

When the combing process has been completed, network cable bundling tool 10 can be disassembled. In one embodiment, first outer jacket half 16 and second outer jacket half 18 are each grasped by the user at opposing surfaces and a force is applied in opposite directions, the force disengaging latch protrusions 40 from their respective latch receiving slots 42, thus separating first outer jacket half 16 and second outer jacket half 18 and releasing inner fitting 12. In another embodiment, strap 56 can be unsecured and first outer jacket half 16 and second outer jacket half 18 can be removed, releasing inner fitting 12. Individual cable strands 20 can be removed from inner fitting 12 by pulling individual cable strand 20 in a direction substantially away from inner fitting spine 24. The force applied by the user will then overcome the force provided by the protrusions located on adjacent inner fitting wings 26. This process is repeated until all of the desired individual cable strands 20 have been removed from inner fitting 12.

The disclosed present invention provides a network cable bundling tool that provide an inexpensive and convenient means to quickly organize individual strands of cables into a compact and space-efficient cable bundle. It should be noted that the above-described and illustrated embodiments and preferred embodiments of the present invention are not an exhaustive listing of the forms such a network cable bundling tool in accordance with the present invention might take; rather, they serve as exemplary and illustrative of embodiments of the present invention as presently understood. Many other forms of the present invention exist and are readily apparent to one having ordinary skill in the art. For instance, other embodiments of inner fitting 12 are also possible without departing from the scope and spirit of the present invention. Specifically, the outer perimeter of inner fitting 12 may take on a substantially square, pentagonal, octagonal or any polygonal shape when viewed from the longitudinal direction. Additionally, the number of pockets 28 defined by inner fitting 12 can vary depending on the desired cable bundle 22 size.

The invention claimed is:

1. An apparatus for organizing a plurality of cables into a bundle, the apparatus comprising:
    an inner fitting having a central spine and a plurality of wings extending from the central spine in a direction substantially perpendicular to the central spine, the plurality of wings defining a plurality of pockets, each of the pockets for receiving a plurality of cables; and
    an outer jacket assembly disposed circumferentially about the inner fitting.

2. The apparatus of claim 1, wherein the inner fitting is substantially hexagonal in shape at its outer dimensions.

3. The apparatus of claim 1, wherein the inner fitting is substantially octagonal in shape at its outer dimensions.

4. The apparatus of claim 1, wherein the inner fitting comprises a static dissipative material.

5. The apparatus of claim 1, wherein each of the plurality of wings comprises lead-in geometry disposed at a terminal end thereof.

6. The apparatus of claim 1, wherein the outer jacket assembly comprises a plurality of outer jacket components.

7. The apparatus of claim 6, wherein said outer jacket assembly comprises a receiving device, the receiving device configured to receive a securing device, the securing device securing the outer jacket components to the inner fitting.

8. The apparatus of claim 1, wherein the outer jacket assembly comprises a retaining assembly, the retaining assembly disposed on an inner surface of the outer jacket assembly and configured to engage and retain the inner fitting.

9. The apparatus of claim 1, wherein the outer jacket assembly comprises a main body and at least one funneling projection extending from the main body.

10. The apparatus of claim 9, wherein the at least one funneling projection is integrally formed with the main body.

11. The apparatus of claim 9, wherein the at least one funneling projection is removably connected to the main body.

12. The apparatus of claim 1, wherein the outer jacket assembly is substantially hexagonal in shape at its inner dimensions.

13. The apparatus of claim 1, wherein the outer jacket assembly is substantially octagonal in shape at its inner dimensions.

14. The apparatus of claim 1, wherein the outer jacket assembly comprises a static dissipative material.

\* \* \* \* \*